(12) United States Patent
Graf et al.

(10) Patent No.: US 8,135,652 B2
(45) Date of Patent: Mar. 13, 2012

(54) PARALLEL SUPPORT VECTOR METHOD AND APPARATUS

(75) Inventors: Hans Peter Graf, Lincroft, NJ (US); Eric Cosatto, Red Bank, NJ (US); Leon Bottou, Princeton, NJ (US); Vladimir N. Vapnik, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 899 days.

(21) Appl. No.: 12/110,519

(22) Filed: Apr. 28, 2008

(65) Prior Publication Data
US 2008/0201281 A1    Aug. 21, 2008

Related U.S. Application Data

(63) Continuation-in-part of application No. 10/978,129, filed on Oct. 29, 2004, now abandoned.

(51) Int. Cl.
*G06F 15/18* (2006.01)
(52) U.S. Cl. .......................................... 706/12
(58) Field of Classification Search ............... 706/12
See application file for complete search history.

(56) References Cited

U.S. PATENT DOCUMENTS

| | | | |
|---|---|---|---|
| 2005/0180627 A1* | 8/2005 | Yang et al. | 382/159 |
| 2006/0224539 A1* | 10/2006 | Zhang et al. | 706/20 |

\* cited by examiner

*Primary Examiner* — Jeffrey A Gaffin
*Assistant Examiner* — Vincent Gonzales
(74) *Attorney, Agent, or Firm* — Paul Schwarz; Joseph Kolodka

(57) ABSTRACT

Disclosed is an improved technique for training a support vector machine using a distributed architecture. A training data set is divided into subsets, and the subsets are optimized in a first level of optimizations, with each optimization generating a support vector set. The support vector sets output from the first level optimizations are then combined and used as input to a second level of optimizations. This hierarchical processing continues for multiple levels, with the output of each prior level being fed into the next level of optimizations. In order to guarantee a global optimal solution, a final set of support vectors from a final level of optimization processing may be fed back into the first level of the optimization cascade so that the results may be processed along with each of the training data subsets. This feedback may continue in multiple iterations until the same final support vector set is generated during two sequential iterations through the cascade, thereby guaranteeing that the solution has converged to the global optimal solution. In various embodiments, various combinations of inputs may be used by the various optimizations. The individual optimizations may be processed in parallel.

10 Claims, 9 Drawing Sheets

PARALLEL SUPPORT VECTOR METHOD AND APPARATUS

RELATED APPLICATIONS

This Application is a continuation-in-part of application Ser. No. 10/978,129, filed Oct. 29, 2004. The entire disclosure of application Ser. No. 10/978,129 is incorporated herein by reference.

FIELD OF THE INVENTION

The present invention relates to machine learning, and more particularly to support vector machines.

BACKGROUND OF THE INVENTION

Machine learning involves techniques to allow computers to "learn". More specifically, machine learning involves training a computer system to perform some task, rather than directly programming the system to perform the task. The system observes some data and automatically determines some structure of the data for use at a later time when processing unknown data.

Machine learning techniques generally create a function from training data. The training data consists of pairs of input objects (typically vectors), and desired outputs. The output of the function can be a continuous value (called regression), or can predict a class label of the input object (called classification). The task of the learning machine is to predict the value of the function for any valid input object after having seen only a small number of training examples (i.e. pairs of input and target output).

One particular type of learning machine is a support vector machine (SVM). SVMs are well known in the art, for example as described in V. Vapnik, *Statistical Learning Theory*, Wiley, New York, 1998; and C. Burges, A Tutorial on Support Vector Machines for Pattern Recognition, Data Mining and Knowledge Discovery 2, 121-167, 1998. Although well known, a brief description of SVMs will be given here for background purposes.

Consider the classification shown in FIG. 1 which shows data having the classification of circle or square. The question becomes, what is the best way of dividing the two classes? An SVM creates a maximum-margin hyperplane defined by support vectors as shown in FIG. 2. The support vectors are shown as 202, 204 and 206 and they define those input vectors of the training data which are used as classification boundaries to define the hyperplane 208. The goal in defining a hyperplane in a classification problem is to maximize the margin (w) 210 which is the distance between the support vectors of each different class. In other words, the maximum-margin hyperplane splits the training examples such that the distance from the closest support vectors is maximized. The support vectors are determined by solving a quadratic programming (QP) optimization problem. There exist several well known QP algorithms for use with SVMs, for example as described in R. Fletcher, *Practical Methods of Optimization*, Wiley, New York, 2001; and M. S. Bazaraa, H. D. Shrali and C. M. Shetty, *Nonlinear Programming: Theory and Algorithms*, Wiley Interscience, New York, 1993. Only a small subset of the of the training data vectors (i.e., the support vectors) need to be considered in order to determine the optimal hyperplane. Thus, the problem of defining the support vectors may also be considered a filtering problem. More particularly, the job of the SVM during the training phase is to filter out the training data vectors which are not support vectors.

As can be seen from FIG. 2, the optimal hyperplane 208 is linear, which assumes that the data to be classified is linearly separable. However, this is not always the case. For example, consider FIG. 3 in which the data is classified into two sets (X and O). As shown on the left side of the figure, in one dimensional space the two classes are not linearly separable. However, by mapping the one dimensional data into 2 dimensional space as shown on the right side of the figure, the data becomes linearly separable by line 302. This same idea is shown in FIG. 4, which, on the left side of the figure, shows two dimensional data with the classification boundaries defined by support vectors (shown as disks with outlines around them). However, the class divider 402 is a curve, not a line, and the two dimensional data are not linearly separable. However, by mapping the two dimensional data into higher dimensional space as shown on the right side of FIG. 4, the data becomes linearly separable by hyperplane 404. The mapping function that calculates dot products between vectors in the space of higher dimensionality is called a kernel and is generally referred to herein as k. The use of the kernel function to map data from a lower to a higher dimensionality is well known in the art, for example as described in V. Vapnik, *Statistical Learning Theory*, Wiley, New York, 1998.

After the SVM is trained as described above, input data may be classified by applying the following equation:

$$y = \text{sign}\left(\sum_{i=1}^{M} \alpha_i k(x_i, x) - b\right)$$

where $x_i$ represents the support vectors, x is the vector to be classified, $\alpha_i$ and b are parameters obtained by the training algorithm, and y is the class label that is assigned to the vector being classified.

The equation $k(x, x_i) = \exp(-\|x - x_i\|^2 / c)$ is an example of a kernel function, namely a radial basis function. Other types of kernel functions may be used as well.

Although SVMs are powerful classification and regression tools, one disadvantage is that their computation and storage requirements increase rapidly with the number of training vectors, putting many problems of practical interest out of their reach. As described above, the core of an SVM is a quadratic programming problem, separating support vectors from the rest of the training data. General-purpose QP solvers tend to scale with the cube of the number of training vectors ($O(k^3)$). Specialized algorithms, typically based on gradient descent methods, achieve gains in efficiency, but still become impractically slow for problem sizes on the order of 100,000 training vectors (2-class problems).

One existing approach for accelerating the QP is based on 'chunking' where subsets of the training data are optimized iteratively, until the global optimum is reached. This technique is described in B. Boser, I. Guyon. V. Vapnik, "A training algorithm for optimal margin classifiers" in Proc. 5th Annual Workshop on Computational Learning Theory, Pittsburgh, ACM, 1992; E. Osuna, R. Freund, F. Girosi, "Training Support Vector Machines, an Application to Face Detection", in Computer vision and Pattern Recognition, pp. 130-136, 1997; and T. Joachims, "Making large-scale support vector machine learning practical", in Advances in Kernel Methods, B. Schölkopf, C. Burges, A. Smola, (eds.), Cambridge, MIT Press, 1998. 'Sequential Minimal Optimization' (SMO), as described in J. C. Platt, "Fast training of support vector machines using sequential minimal optimization", in Adv. in Kernel Methods: Schölkopf, C. Burges, A. Simola (eds.), 1998 reduces the chunk size to 2 vectors, and is the most popular of these chunking algorithms. Eliminating non-support vectors early during the optimization process is another strategy that provides substantial savings in computation. Efficient SVM implementations incorporate steps known as 'shrinking' for early identification of non-support vectors, as described in T. Joachims, "Making large-scale support vector machine learning practical", in Advances in Kernel Methods, B. Schölkopf, C. Burges, A. Smola, (eds.), Cambridge, MIT Press, 1998; and R. Collobert, S. Bengio, and J. Mariéthoz, Torch: A modular machine learning software library, Technical Report IDIAP-RR 02-46, IDIAP, 2002. In combination with caching of the kernel data, these techniques reduce the computation requirements by orders of magnitude. Another approach, named 'digesting', and described in D. DeCoste and B. Schölkopf, "Training Invariant Support Vector Machines", Machine Learning, 46-161-190, 2002 optimizes subsets closer to completion before adding new data, thereby saving considerable amounts of storage.

Improving SVM compute-speed through parallelization is difficult due to dependencies between the computation steps. Parallelizations have been attempted by splitting the problem into smaller subsets that can be optimized independently, either through initial clustering of the data or through a trained combination of the results from individually optimized subsets as described in R. Collobert, Y. Bengio, S. Bengio, "A Parallel Mixture of SVMs for Very Large Scale Problems", in Neutral Information Processing Systems, Vol. 17, MIT Press, 2004. If a problem can be structured in this way, data-parallelization can be efficient. However, for many problems, it is questionable whether, after splitting into smaller problems, a global optimum can be found. Variations of the standard SVM algorithm, such as the Proximal SVM as described in A. Tveit, H. Engum, Parallelization of the Incremental Proximal Support Vector Machine Classifier using a Heap-based Tree Topology, Tech. Report, IDI, NTNU, Trondheim, 2003 are better suited for parallelization, but their performance and applicability to high-dimensional problems remain questionable. Another parallelization scheme as described in J. X. Dong, A. Krzyzak, C. Y. Suen, "A fast Parallel Optimization for Training Support Vector Machine." *Proceedings of 3$^{rd}$ International Conference on Machine Learning and Data Mining*, P. Perner and A. Rosenfeld (Eds.) Springer Lecture Notes in Artificial Intelligence (LNAI 2734), pp. 96-105, Leipzig, Germany, Jul. 5-7, 2003, approximates the kernel matrix by a block-diagonal.

Although SVMs are powerful regression and classification tools, they suffer from the problem of computational complexity as the number of training vectors increases. What is needed is a technique which improves SVM performance, even in view of large input training sets, while guaranteeing that a global optimum solution can be found.

SUMMARY

Disclosed herein is an improved method and apparatus for training a support vector machine using a distributed architecture. In accordance with the principles disclosed herein, a training data set is broken up into smaller subsets and the subsets are optimized individually. The partial results from the smaller optimizations are then combined and optimized again in another level of processing. This continues in a cascade type processing architecture until satisfactory results are reached. The particular optimizations generally consist of solving a quadratic programming optimization problem.

In one embodiment, the training data is divided into subsets, and the subsets are optimized in a first level of optimizations, with each optimization generating a support vector set. The support vector sets output from the first level optimizations are then combined and used as input to a second level of optimizations. This hierarchical processing continues for multiple levels, with the output of each prior level being fed into the next level of optimizations. Various options are possible with respect to the technique for combining the output of one optimization level for use as input in the next optimization level.

In one embodiment, a binary cascade is implemented such that in each level of optimization, the support vectors output from two optimizations are combined into one input for a next level optimization. This binary cascade processing continues until a final set of support vectors is generated by a final level optimization. This final set of support vectors may be used as the final result and will often represent a satisfactory solution. However, in order to guarantee a global optimal solution, the final support vector set may be fed back into the first level of the optimization cascade during another iteration of the cascade processing so that the results may be processed along with each of the training data subsets. This feedback may continue in multiple iterations until the same final support vector set is generated during two sequential iterations through the cascade, thereby guaranteeing that the solution has converged to the global optimal solution.

As stated above, various combinations of inputs may be used by the various optimizations. For example, in one embodiment, the training data subsets may be used again as inputs in later optimization levels. In another alternative, the output of an optimization at a particular processing level may be used as input to one or more optimizations at the same processing level. The particular combination of intermediate support vectors along with training data will depend upon the particular problem being solved.

It will be recognized by those skilled in the art that the processing in accordance with the present disclosure effectively filters subsets of the training data in order to find support vectors for each of the training data subsets. By continually filtering and combining the optimization outputs, the support vectors of the entire training data set may be determined without the need to optimize (i.e., filter) the entire training data set at one time. This substantially improves upon the processing efficiency of the prior art techniques. In accordance with another advantage, the hierarchical processing in accordance with the present disclosure allows for parallelization to an extent that was not possible with prior techniques. Since the optimizations in each level are independent of each other, they may be processed in parallel, thereby providing another significant advantage over prior techniques.

These and other advantages of the disclosure will be apparent to those of ordinary skill in the art by reference to the following detailed description and the accompanying drawings.

DETAILED DESCRIPTION

Figure 1:
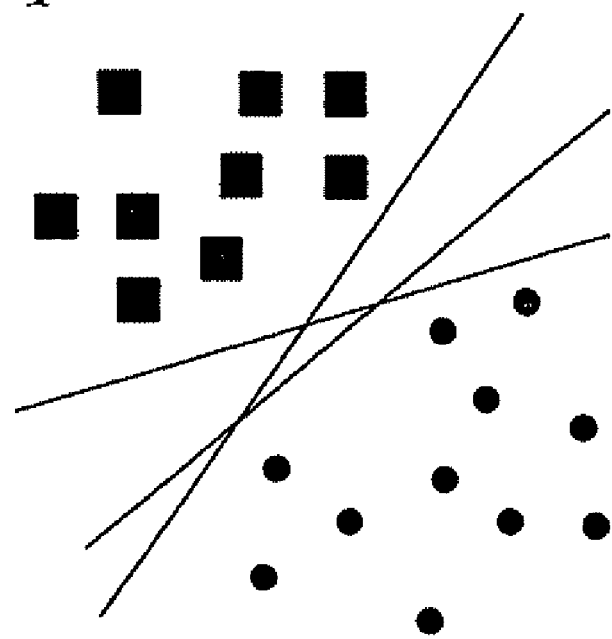
FIG. 1 shows a 2-class data set.
Figure 2:
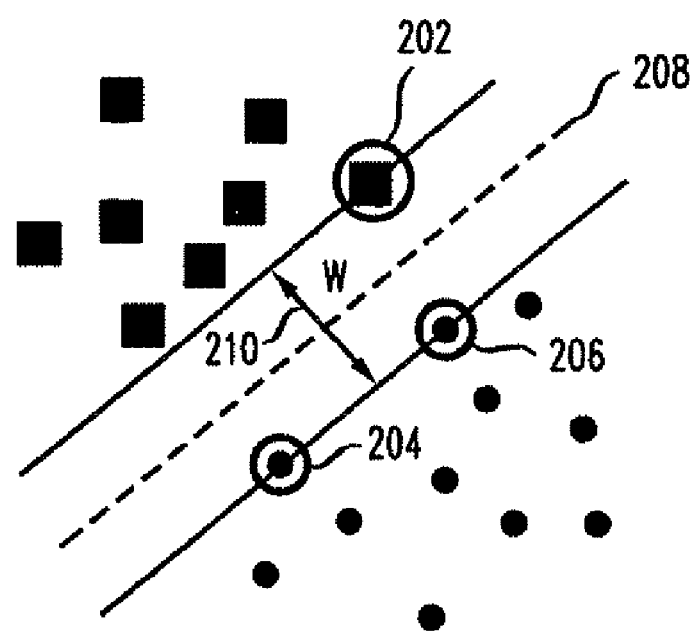
FIG. 2 shows a 2-class data set classified using a maximum-margin hyperplane defined by support vectors.
Figure 3:
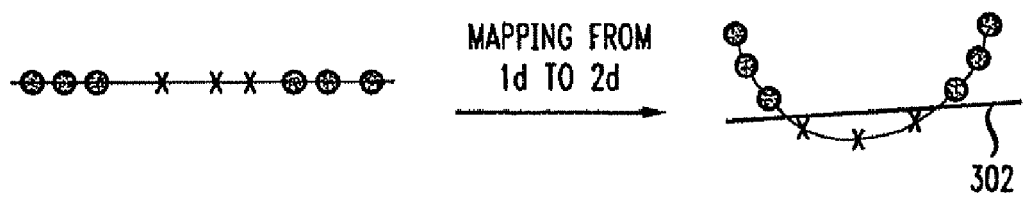
FIGS. 3 and 4 illustrate mapping lower dimensional data into higher dimensional space so that the data becomes linearly separable.
Figure 4:
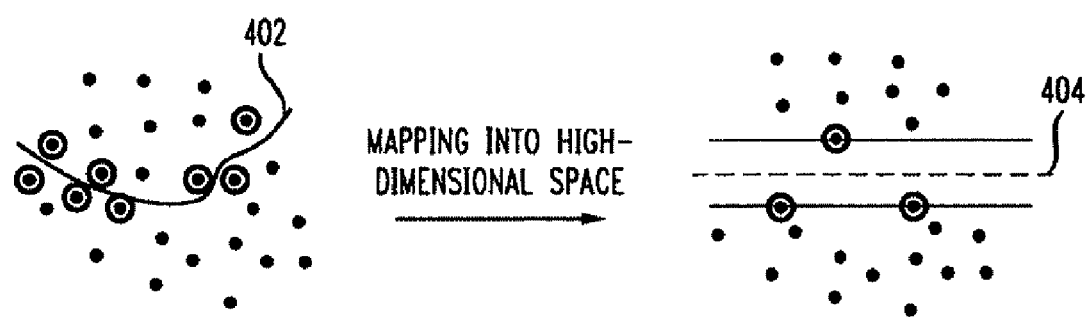
Figure 5:
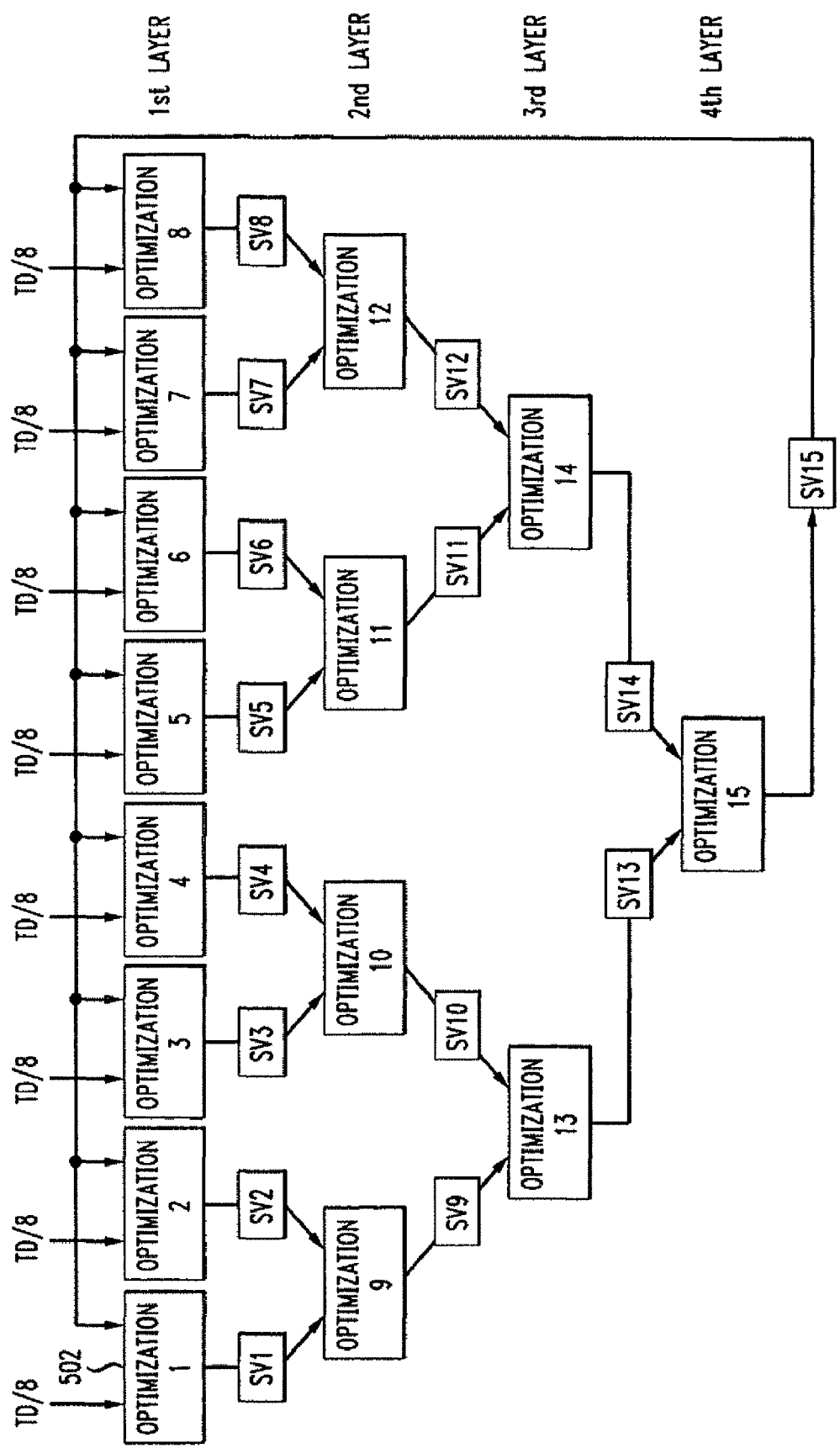
FIG. 5 shows a schematic diagram of one embodiment of a cascade support vector machine in accordance with the present disclosure.

FIG. 5 shows a schematic diagram of one embodiment of a cascade support vector machine (SVM) in accordance with the principles of the present disclosure. One skilled in the art will recognize that the FIG. 5 shows the architecture of a cascade SVM in terms of functional elements, and that FIG. 5 generally describes the functions and steps performed by a cascade SVM. Actual hardware embodiments may vary and it will be readily apparent to one skilled in the art how to implement a cascade SVM in accordance with the present disclosure given the following description. For example, the functions described herein may be performed by one or more computer processors which are executing computer program code which defines the functionality described herein. One skilled in the art will also recognize that the functionality described herein may be implemented using hardware, software, and various combinations of hardware and software.

FIG. 5 shows a hierarchical processing technique (i.e., cascade SVM) in accordance with one embodiment. A plurality of optimization functions (e.g., optimization-1 502) are shown at a first, second, third, and fourth processing layers. It is pointed out that the functional blocks labeled as optimization-N represent well known SVM optimizations (as will be described in further detail below in connection with FIGS. 6 and 7). As such, these functional blocks could also be appropriately labeled as SVM-N as each such block implements an SVM. In accordance with this embodiment, the training data (TD) is split into 8 subsets, each represented as TD/8, and each of these training data subsets are input into an associated first layer optimization function as shown. Using well known SVM optimization techniques, each optimization produces and outputs associated support vectors (SV). This optimization may also be described as a filtering process as the noisy input data is filtered to filter out some of the input vectors which are making the input data noisy and to output a reduced set of the input vectors, which set corresponds to data that is substantially or entirely devoid of noise, called support vectors. In FIG. 5, SVi represents the support vectors produced by optimization i.

The support vectors output from the first layer optimizations (optimizations 1 through 8) are combined as shown in FIG. 5 and the combined SVs are used as input to a second layer of optimizations (optimizations 9 through 12). The support vectors output from the second layer optimizations (optimizations 9 through 12) are combined as shown and the combined SVs are used as input to a third layer of optimizations (optimizations 13 and 14). The support vectors output from the third layer optimizations (optimizations 13 and 14) are combined as shown and the combined SVs are used as input to a fourth layer optimization (optimization 15). The output of optimization 15 after a single pass through the cascade SVM is a set of support vectors which will often provide a satisfactory set of support vectors for the entire training data. If however, the global optimal result is required, then the output support vectors of the last layer of optimizations (e.g., optimization 15) are fed back through the SVM cascade to layer 1, along with the initial training data subsets that were used during the initial pass through the cascade. Optimizations 1 through 8 are then repeated with their initial training data subsets as well as the support vectors output from optimization 15. If the support vectors output from optimization 15 after a second pass through the SVM cascade are the same as the support vectors output from optimization 15 during the previous iteration, then the global optimal result has been found and processing may end. Otherwise, the support vectors output from optimization 15 are again passed to the first layer optimizations and another iteration of the cascade SVM is performed.

One advantage of processing in accordance with the architecture shown in FIG. 5 is that a single SVM (i.e., single optimization) never has to deal with the entire training set. If the optimizations in the first few layers are efficient in extracting the support vectors (i.e., filtering out the non-support vectors of the input data) then the largest optimization (the one of the last layer) has to process only a few more vectors than the number of actual support vectors. Therefore, in problems where the support vectors are a small subset of the training vectors—which is usually the case—each of the optimizations shown in FIG. 5 is much smaller than a single optimization on the entire training data set.

Another advantage of processing in accordance with the architecture shown in FIG. 5 is that parallelization may be exploited to an extent that was not possible with prior techniques. The optimizations in each level are independent of each other, and as such may be processed in parallel. This is a significant advantage in terms of processing efficiency over prior techniques.

The optimization functions will now be described in further detail in connection with FIGS. 6 and 7. We describe here a 2-class classification problem, solved in dual formulation. The 2-class problem is the most difficult to parallelize because there is no natural split into sub-problems. Multi-class problems can always be separated into 2-class problems.

The principles of the present disclosure do not depend upon the details of the optimization algorithm and alternative formulations or regression algorithms map equally well onto the inventive architecture. Thus, the optimization function described herein is but one example of an optimization function that would be appropriate for use in conjunction with the present disclosure.

Let us consider a set of l training examples $(x_i; y_i)$; where $x_i \in R^d$ represents a d-dimensional pattern and $y_i = \pm 1$ the class label. $K(x_i, x_j)$ is the matrix of kernel values between patterns and $\alpha_i$ the Lagrange coefficients to be determined by the optimization. The SVM solution for this problem consists in maximizing the following quadratic optimization function (dual formulation):

$$\max W(\alpha) = -1/2 * \sum_{i}^{l} \sum_{j}^{l} \alpha_i \alpha_j y_i y_j K(x_i, x_j) + \sum_{i}^{l} \alpha_i$$

$$\text{Subject to: } 0 \leq \alpha_i \leq C, \forall i \text{ and } \sum_{i}^{l} \alpha_i y_i = 0$$

The gradient $G = \nabla W(\alpha)$ of W with respect to $\alpha_i$ is then:

$$G_i = \frac{\partial W}{\partial \alpha_i} = -y_i \sum_{j=1}^{l} y_j \alpha_j K(x_i, x_j) + 1$$

Figure 6:
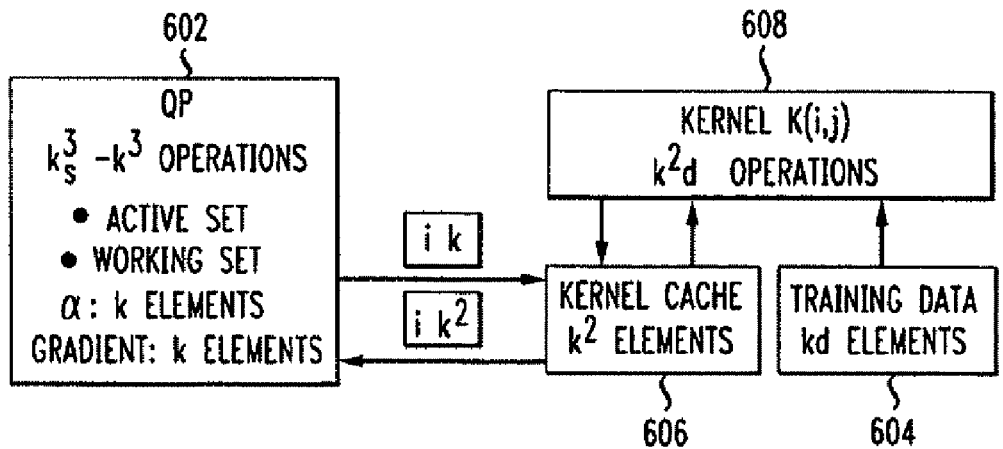
FIG. 6 shows a block diagram illustrating support vector optimization.
Figure 7:
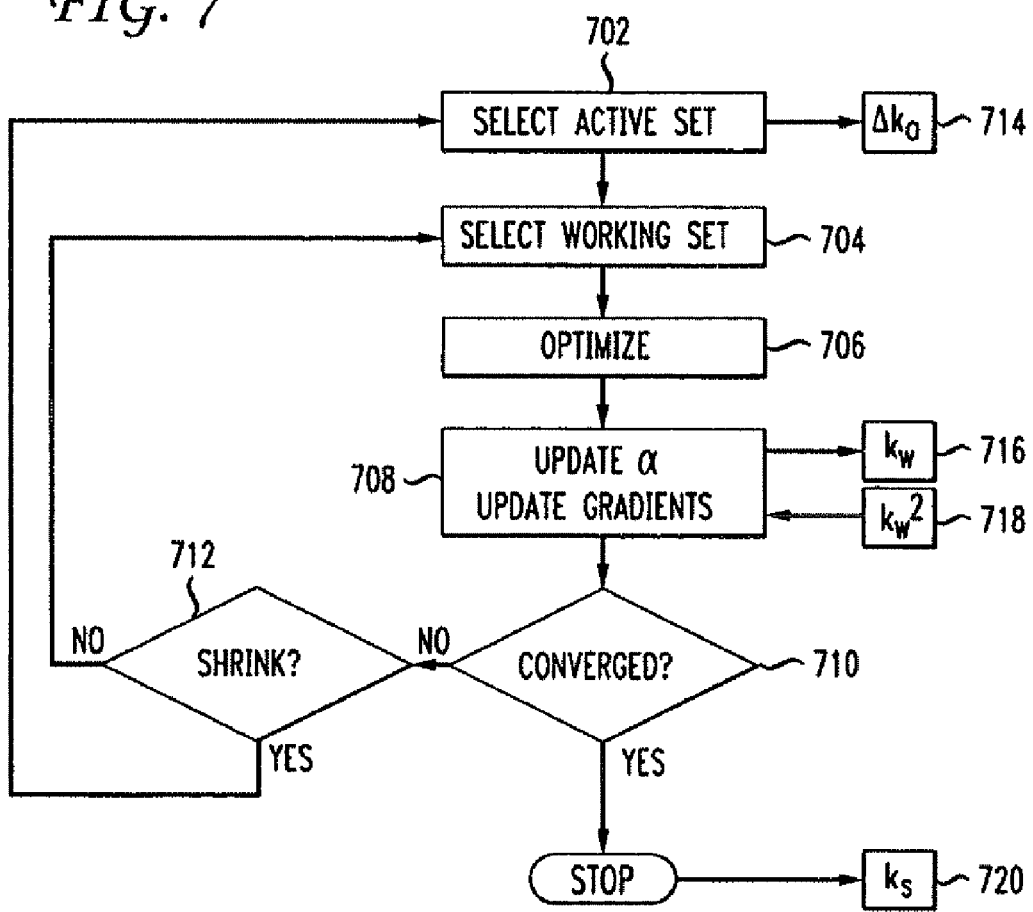
FIG. 7 is a flowchart of the steps performed during quadratic programming optimization.

FIG. 6 shows a high level block diagram illustrating how data may be organized for support vector optimization. In FIG. 6, k represents the number of training vectors, d represents the dimensionality of the vectors, and i represents the number of iterations over the training set. Block 602 represents execution of the actual optimization, which requires only the kernel values between training data, but not the data themselves. Therefore, the training data are maintained in a separate block 604. An important consideration for good performance of the optimization algorithm is the calculation of kernel values. Often this computation strongly dominates the overall computation requirements. It is therefore advantageous to cache the values of the kernel computation, so that if a kernel value is used multiple times during the optimization, it is calculated only once. Block 606 represents the kernel cache where these intermediate data are stored and block 608 represents the calculation of the kernel values. FIG. 7 shows a flowchart of the steps performed during the quadratic optimization of block 602. The optimization starts by selecting an active set (702) that is a subset of all training data, and only these data are considered for the optimization at this time. A working set is selected from the active set (704), optimization is performed on this subset (706), and the gradients are updated (708). The optimization proceeds through a gradient descent algorithm and when the gradients meet certain criteria, it can be decided that convergence has been reached. If the optimization has not yet converged, then it is determined in step 712 whether any of the training samples can be eliminated from the active set. This may be performed by determining whether the training samples fulfill a Karush-Kuhn-Tucker (KKT) condition or other appropriate condition. If the test of step 712 is no, then another working set is selected in step 704, and steps 706 through 710 are repeated as shown. If the test of step 712 is yes, then some training samples may be eliminated from the active set and the new active set is selected in step 702, and steps 704 through 712 are repeated as shown. Upon convergence, the optimization ends. If the data are organized as indicated in FIG. 6, then the optimization process of FIG. 7 requires the exchange of data between various modules. This data exchange is indicated by blocks 714, 716, 718 and 720. When an active set is selected in step 702, the indices in block 714 are sent to the kernel cache 606 so that the kernel cache knows which data need to be calculated and stored. During the gradient update of step 708 in the optimization loop, the data in block 716 are sent to the kernel cache 606 and the data in block 718 are sent back. The final results of the optimization are returned via block 720.

The cascade SVM architecture in accordance with the principles of the present disclosure (e.g., as shown in the FIG. 5 embodiment) has been proven to converge to the global optimum. For the interested reader, this proof has been included at the end of this detailed description. As set forth in the proof (theorem 3), a layered Cascade architecture is guaranteed to converge to the global optimum if we keep the best set of support vectors produced in one layer, and use it in at least one of the subsets in the next layer. This is the case in the binary Cascade shown in FIG. 5. However, not all layers meet another requirement of the proof (assertion ii of Definition 1) which requires that the union of sets in a layer is equal to the whole training set (in the binary Cascade of FIG. 5 this is only true for the first layer). For practical reasons it is advantageous to implement the Cascade in this manner as there may be little computational gain if we searched all training vectors in each layer. By introducing the feedback loop that enters the result of the last layer into the first one, combined with all non-support vectors, we fulfill all requirements of the proof. We can test for global convergence in layer 1 and do a fast filtering in the subsequent layers.

Figure 8A:
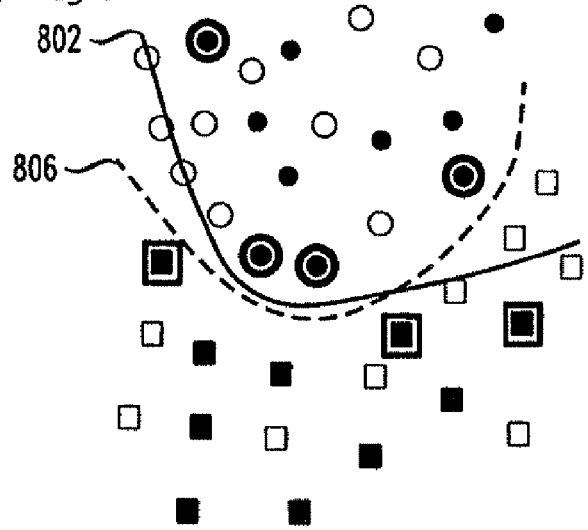
FIGS. 8A, 8B and 8C show an intuitive diagram of the filtering process in accordance with the disclosure.
Figure 8B:
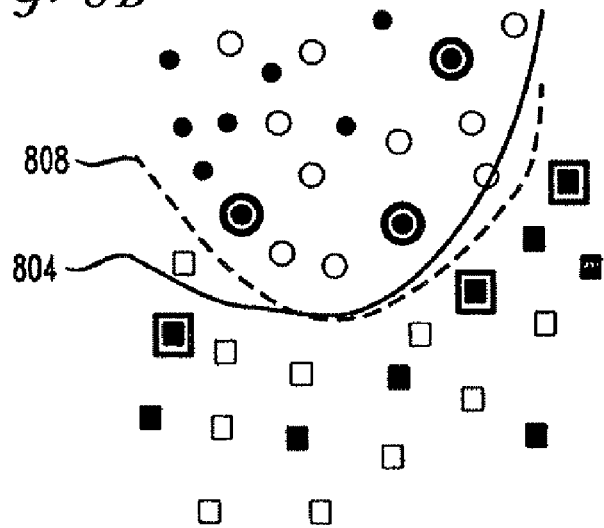
Figure 8C:
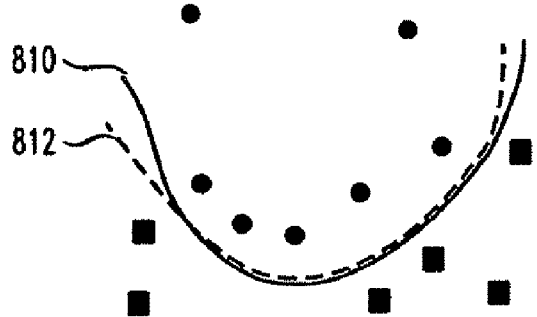

As seen from the above description, a cascade SVM in accordance with the principles of the disclosure will utilize a subset of the training data in each of a plurality of optimizations and the optimizations filter the training data subsets in order to determine support vectors for the processed training data subset. An intuitive diagram of the filtering process in accordance with the principles of the disclosure are shown in FIGS. 8A, 8B and 8C. First, prior to describing FIGS. 8A-C, consider a subset $S \subset \Omega$ which is chosen randomly from the training set. This subset will most likely not contain all support vectors of $\Omega$ and its support vectors may not be support vectors of the whole problem. However, if there is not a serious bias in a subset, then support vectors of S are likely to contain some support vectors of the whole problem. Stated differently, it is plausible that 'interior' points in a subset are going to be 'interior' points in the whole set. Therefore, a non-support vector of a subset has a good chance of being a non-support vector of the whole set and we can eliminate it from further analysis. This is illustrated in FIGS. 8A-8C. Consider a set of training data containing two classes, circles and squares, and two disjoint subsets of training data are selected for separate optimization. FIG. 8A represents one optimization in which the solid elements are selected as the training data subset and FIG. 8B represents another optimization in which the solid elements are selected as the training data subset. The support vectors determined in each of the optimizations are shown with outlines. Line 802 shows the classification boundary of the optimization of FIG. 8A and line 804 shows the classification boundary of the optimization of FIG. 8B. The dashed lines 806 and 808 in FIGS. 8A and 8B respectively represent the classification boundary for the entire training data set. The support vectors of the two optimizations represented by FIGS. 8A and 8B are combined in the next layer optimization, and that next layer optimization is represented in FIG. 8C. Line 810 shows the classification boundary resulting from the next layer optimization, and as can be seen in FIG. 8C, is very close to the classification boundary 812 for the entire training set. This result is obtained even though optimization is never performed on the entire training set at the same time.

Figure 9:
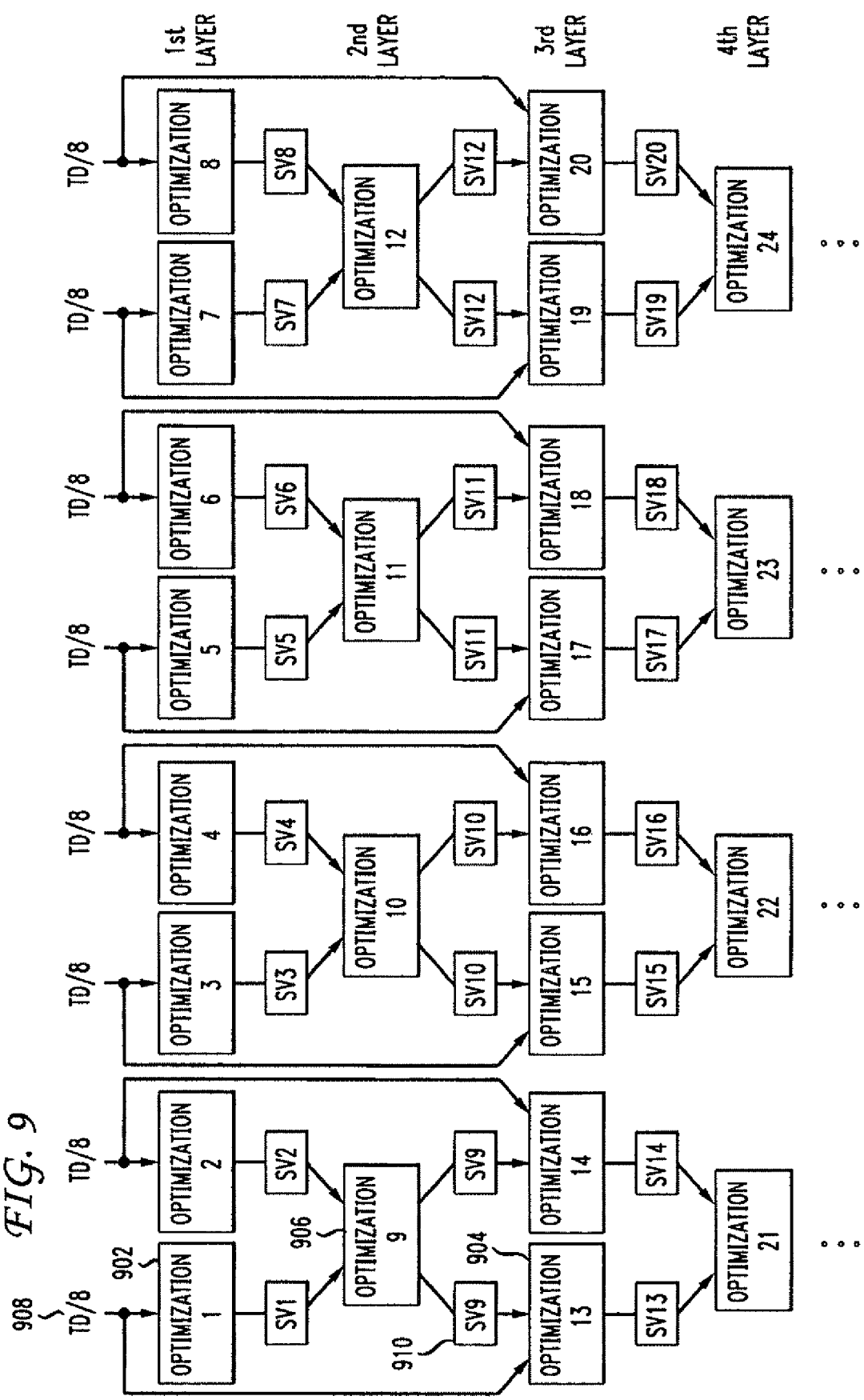
FIG. 9 shows a schematic diagram of one embodiment of a cascade support vector machine in accordance with the present disclosure.

Having described one embodiment of a cascade SVM in accordance with the principles of the present disclosure, a second alternative embodiment will now be described in conjunction with FIG. 9 which shows a hierarchical processing technique in accordance with another embodiment. A plurality of optimization functions (e.g., optimization-1 902) are shown at a first, second, third, and fourth processing layer. Once again, the functional blocks labeled as optimization-N represent well known SVM optimizations as described in further detail above in connection with FIGS. 6 and 7. In accordance with this embodiment, the training data (TD) is split into 8 subsets, each represented as TD/8, and each of these training data subsets are input into an associated first layer optimization function as shown. Each optimization filters the input data and outputs associated support vectors (SV). In FIG. 9, SVi represents the support vectors produced by optimization i.

The support vectors output from the first layer optimizations (optimizations 1 through 8) are combined as shown in FIG. 9 and the combined SVs are used as input to a second layer of optimizations (optimizations 9 through 12). Up until this point, the processing is very similar to the processing discussed above in conjunction with the embodiment of FIG. 5. However, unlike the FIG. 5 embodiment, in the FIG. 9 embodiment the support vectors output from the second layer optimizations (SV9, SV10, SV11, SV12) are not combined with each other, but instead are used as input to a third layer of optimizations (optimizations 13 through 20) along with one of the original training data subsets. For example, third level optimization 13 (904) receives as one input support vector SV9 910 which was output from second level optimization 9 (906), and receives as another input training data subset 908. It is pointed out that rather than receiving the entire training data subset 908 as input, optimization 13 (904) only actually needs to receive those vectors from training data subset 908 which are not already included in SV9 910. Thus, in this manner, the third level optimizations (optimizations 13 through 20) test the support vectors output from the second level optimizations (SV9, SV10, SV11, SV12) against training data subsets as shown. The support vectors output from the third layer optimization (SV13 through SV20) are then combined and used as input to the fourth layer optimizations (optimizations 21 through 24) as shown in FIG. 9. The processing of FIG. 9 may then continue in various ways, and the further processing would depend upon the particular implementation. For example, the support vectors output from the fourth layer optimizations (optimizations 21 through 24) could be combined and used as input for a fifth layer optimization, or the support vectors output from the fourth layer optimizations could be tested against various subsets of the input training data. Further, the FIG. 9 processing may also make use of a feedback technique described above in connection with FIG. 5 in which the support vectors output from a particular processing layer are used as input to another iteration of processing through the cascade.

The embodiment shown in FIG. 9 is used to illustrate one of the many alternate embodiments which may be implemented in accordance with the present disclosure. There are of course many additional embodiments which may be implemented by one skilled in the art given the present detailed description.

The embodiments shown in FIGS. 5 and 9 are two particular embodiments of SVM implementation in accordance with the principles of the present disclosure. As seen from the above description, the SVM's of FIGS. 5 and 9 are used as filters to filter out the various data vectors from the input training data and to determine the set of support vectors for the entire set of training data. Thus, the more general idea described here is the use of SVM's as filters, and to select and merge the output of prior layers of SVM optimizations with subsequent layers of SVM optimizations in order to more efficiently and accurately filter the input data set. Various techniques for such selection and merging may be used, and different techniques will be appropriate for different problems to be solved.

Figure 10:
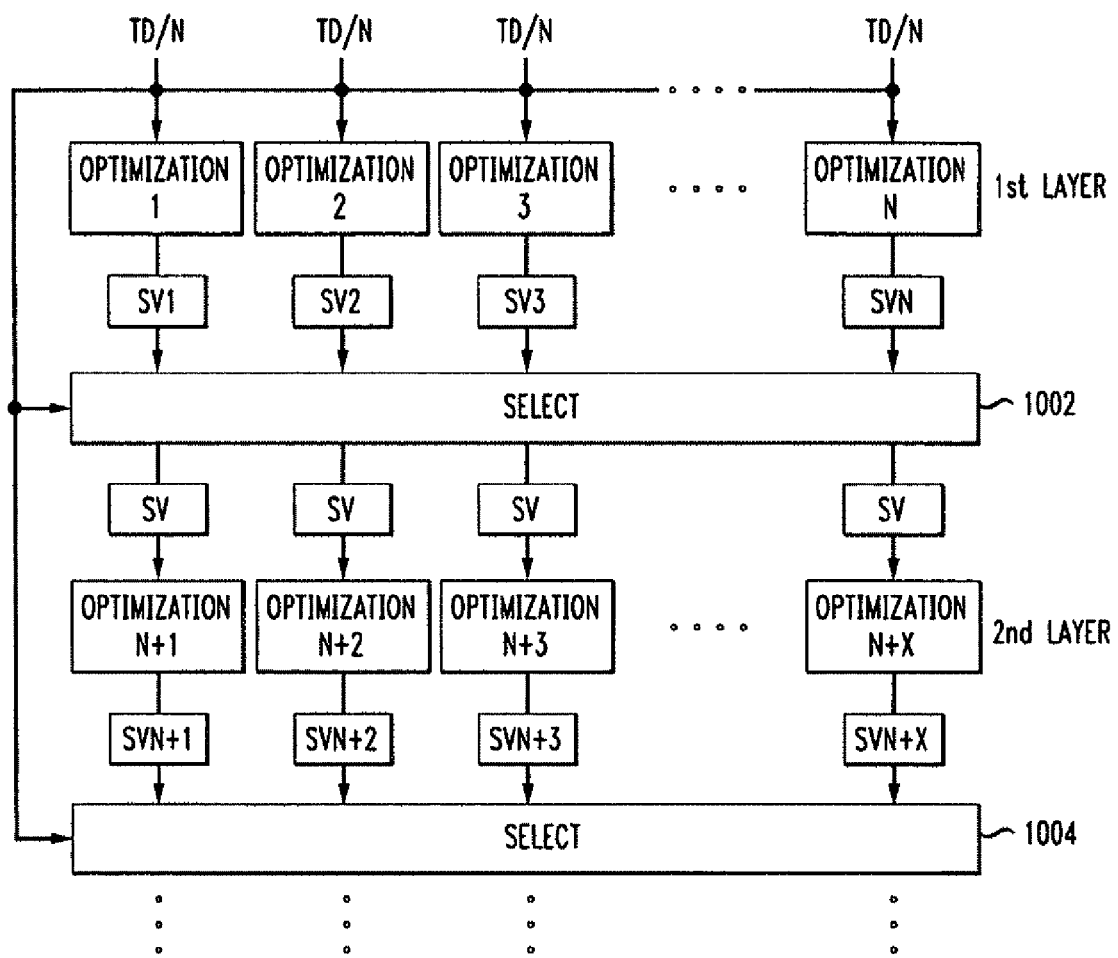
FIG. 10 is a block diagram illustrating the high level concept of selecting and merging support vectors output from prior level support vector machine processing for input into a subsequent level support vector machine processing.

FIG. 10 is a block diagram illustrating the high level concept of selecting and merging support vectors output from prior level SVM processing for input into a subsequent level SVM processing. As shown in FIG. 10, a first layer of optimizations (optimizations 1 through N) are shown for processing N training data subsets (TD/1 . . . TD/N) and producing support vectors SV1 through SVN. The support vectors SV1 through SVN are then selected via processing block 1002 for further processing by subsequent optimizations layers. The selection bock 1002 represents various types of possible processing of the support vectors, including selecting, merging, combining, extracting, separating, etc., and one skilled in the art will recognize that various combinations and permutations of processing may be used by select function 1002 prior to passing the support vectors to the subsequent layer of optimization processing. In addition, the select function 1002 may also include the addition of vectors from the input data set as represented by arrow 1004.

After the support vectors output from the first layer optimizations are processed by block 1002, the output of the select function 1002 is used as input to the next layer of optimization processing (here layer 2) as represented by optimizations N+1, N+2 . . . N+X. These second layer optimizations produce support vectors SVN+1 through SVN+X. Again, select function 1004 (which may be the same as, or different from, select function 1002) processes the support vectors output from the second level optimizations (and optionally all or part of the input training data) to generate the input for a next layer of optimization processing. This processing may continue until a final set of support vectors are generated.

As seen from the above discussion, the selection of vectors for a next layer of processing can be done in many ways. The requirement for guaranteed convergence is that the best set of support vectors within one layer are passed to the next layer along with a selection of additional vectors. This guarantees that the optimization function:

$$W(\alpha) = \sum_{i=1}^{l} \alpha_i - \frac{1}{2} \sum_{i=1}^{l} \sum_{j=1}^{l} y_i y_j \alpha_i \alpha_j k(x_i, x_j)$$

is decreasing in every layer and therefore the global optimum is going to be reached. Not only is it guaranteed that the global optimum is going to be reached, but it is reached in a finite number of steps.

Figure 11:
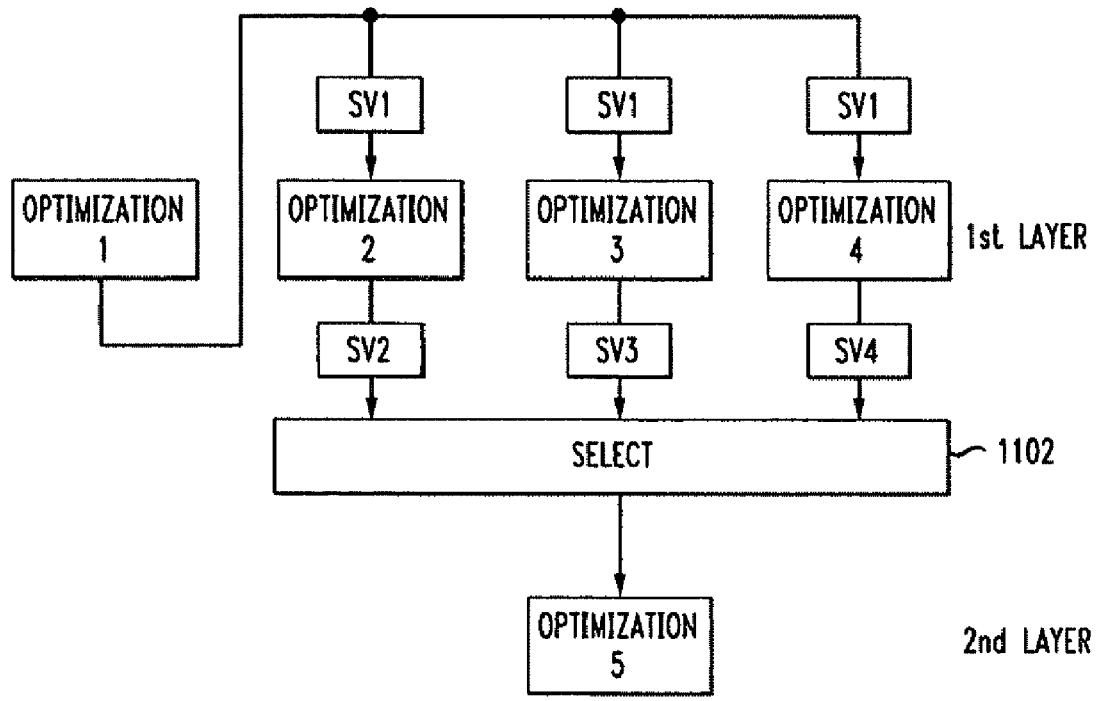
FIG. 11 illustrates the use of a support vector set of an optimization within a particular layer as an input to other optimizations within the same layer.

It is noted that one of the problems of large SVMs is the increase in the number of support vectors due to noise. One of the keys for improved performance of these large SVMs is the rejection of outlier support vectors which are the result of such noise. One technique for handling this problem is shown in FIG. 11 in which the support vector of an optimization within a particular layer is used as input to other optimizations within the same layer. For example, as shown in FIG. 11, support vector SV1 which is output from optimization 1 is used as an input (along with other inputs) to optimization 2, optimization 3, and optimization 4, all within the same optimization layer as optimization 1. The support vectors SV2, SV3 and SV4 are selected via select function 1102 and the output of select function 1102 is used as the input for at least one subsequent optimization layer.

Figure 12:
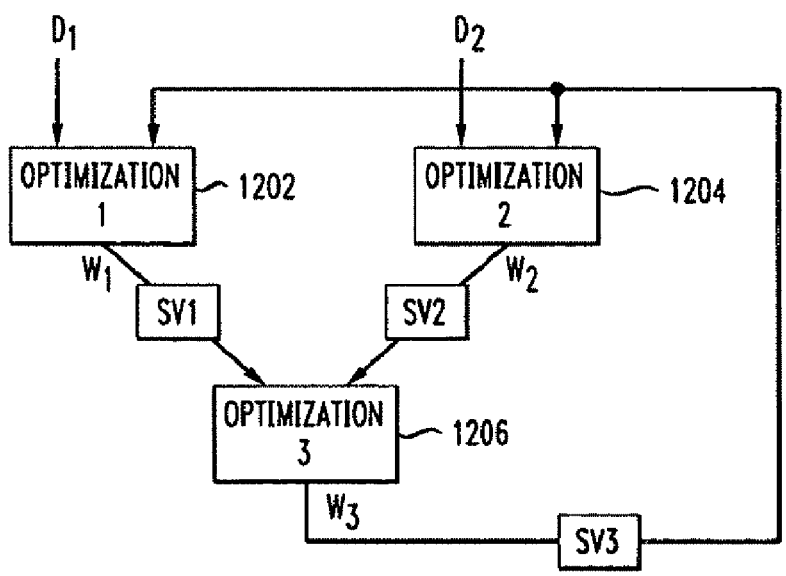
FIG. 12 shows a support vector machine and is used to describe a technique for efficient merging of prior level support vectors in terms of a gradient-ascent algorithm.

Performance of an SVM in accordance with the principles of the disclosure depends at least in part on the advancement of the optimization as much as possible in each of the optimization layers. This advancement depends upon how the training data is initially split into subsets, how the support vectors from prior layers are merged (e.g., the select function described above), and how well an optimization can process the input from the prior layer. We will now describe a technique for efficient merging of prior level support vectors in terms of a gradient-ascent algorithm in conjunction with the cascade SVM shown in FIG. 12. FIG. 12 shows three optimizations (i.e., SVMs) optimization 1 (1202), optimization 2 (1204) and optimization 3 (1206). Optimization 1 (1202) receives input training data subset $D_1$ and optimization 2 (1204) receives input training data subset $D_2$. $W_i$ represents the objective function of optimization i (in vector notation) and is given as:

$$W_i = -\frac{1}{2}\vec{\alpha}_i^T Q_i \vec{\alpha}_i + \vec{e}_i^T \vec{\alpha}_i$$

$G_i$ represents the gradient of $SVM_i$ (in vector notation) and is given as:

$$G_i = -\vec{\alpha}_i^T Q_i + \vec{e}_i$$

$e_i$ is a vector with all 1s. $Q_i$ is the kernel matrix. Gradients of optimization 1 and optimization 2 (i.e., SV1 and SV2 respectively) are merged and used as input to optimization 3 where the optimization continues. When merging SV1 and SV2, optimization 3 may be initialized to different starting points. In the general case the merged set starts with the following optimization function and gradient:

$$W_{12} = -\frac{1}{2}\begin{bmatrix}\vec{\alpha}_1\\\vec{\alpha}_2\end{bmatrix}^T \begin{bmatrix} Q_1 & Q_{12} \\ Q_{21} & Q_2 \end{bmatrix}\begin{bmatrix}\vec{\alpha}_1\\\vec{\alpha}_2\end{bmatrix} + \begin{bmatrix}\vec{e}_1\\\vec{e}_2\end{bmatrix}^T\begin{bmatrix}\vec{\alpha}_1\\\vec{\alpha}_2\end{bmatrix}$$

$$\vec{G}_{12} = -\begin{bmatrix}\vec{\alpha}_1\\\vec{\alpha}_2\end{bmatrix}^T \begin{bmatrix} Q_1 & Q_{12} \\ Q_{21} & Q_2 \end{bmatrix} + \begin{bmatrix}\vec{e}_1\\\vec{e}_2\end{bmatrix}$$

We consider two possible initializations:

$\vec{\alpha}_1 = \vec{\alpha}_1$ of optimization 1; $\vec{\alpha}_2 = \vec{0}$; Case 1:

$\vec{\alpha}_1 = \vec{\alpha}_1$ of optimization 1; $\vec{\alpha}_2 = \vec{\alpha}_2$ of optimization 2. Case 2:

Since each of the subsets fulfills the Karush-Kuhn-Tucker (KKT) conditions, each of these cases represents a feasible starting point with: $\Sigma\alpha_i y_i = 0$.

Intuitively one would probably assume that case 2 is the preferred one since we start from a point that is optimal in the two spaces defined by the vectors $D_1$ and $D_2$. If $Q_{12}$ is 0 ($Q_{21}$ is then also 0 since the kernel matrix is symmetric), the two spaces are orthogonal co-spaces (in feature space) and the sum of the two solutions is the solution of the whole problem. Therefore, case 2 is indeed the best choice for initialization, because it represents the final solution. If, on the other hand, the two subsets are identical, then an initialization with case 1 is optimal, since this now represents the solution of the whole problem. In general, the problem lies somewhere between these two cases and therefore it is not obvious which case is best. This means that the two sets of data $D_1$ and $D_2$ usually are not identical nor are they orthogonal to each other. Therefore it is not obvious which of the two cases is preferable and, depending on the actual data, one or the other will be better.

Experimental results have shown that a cascade SVM implemented in accordance with the present disclosure provides benefits over prior SVM processing techniques. One of the main advantages of the cascade SVM architecture in accordance with the present disclosure is that it requires less memory than a single SVM. Since the size of the kernel matrix scales with the square of the active set, the cascade SVM requires only about a tenth of the memory for the kernel cache.

As far as processing efficiency, experimental tests have shown that a 9-layer cascade requires only about 30% as many kernel evaluations as a single SVM for 100,000 training vectors. Of course, the actual number of required kernel evaluations depends on the caching strategy and the memory size.

For practical purposes often a single pass through the SVM cascade produces sufficient accuracy. This offers an extremely efficient and simple way for solving problems of a size that were out of reach of prior art SVMs. Experiments have shown that a problem of half a million vectors can be solved in a little over a day.

A cascade SVM in accordance with the principles of the present disclosure has clear advantages over a single SVM because computational as well as storage requirements scale higher than linearly with the number of samples. The main limitation is that the last layer consists of one single optimization and its size has a lower limit given by the number of support vectors. This is why experiments have shown that acceleration saturates at a relatively small number of layers. Yet this is not a hard limit since by extending the principles used here a single optimization can actually be distributed over multiple processors as well.

The cascade SVM methods disclosed herein may be readily adapted and utilized to construct a separating or decision function which describes (e.g., classifies, predicts, etc.) data in multidimensional space, the data corresponding to a phenomenon of interest, e.g., images, text, stock prices, etc. More specifically, the applications include, for example and without limitation, general pattern recognition (including image recognition, object detection, and speech and handwriting recognition), regression analysis and predictive modeling (including quality control systems and recommendation systems), data classification (including text and image classification and categorization), bioinformatics (including automated diagnosis systems, biological modeling, and bio-imaging classification), data mining (including financial forecasting, database marketing), etc.

As alluded to above, one skilled in the art will recognize that any suitable computer system may be used to execute the cascade SVM methods disclosed herein. The computer system may include, without limitation, a mainframe computer system, a workstation, a personal computer system, a personal digital assistant (PDA), or other device or apparatus having at least one processor that executes instructions from a memory medium.

The computer system may further include a display device or monitor for displaying operations associated with the cascade SVM methods disclosed herein and one or more memory mediums on which one or more computer programs or software components may be stored. For example, one or more software programs which are executable to perform the cascade SVM methods described herein may be stored in the memory medium. The one or more memory mediums may also be used for storing data processed and transformed by the cascade SVM disclosed herein. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The cascade SVM methods described herein may also be executed in hardware, a combination of software and hardware, or other suitable executable implementations. The cascade SVM methods implemented in software may be executed by the processor of the computer system or the processor or processors of the one or more associated computers or computer systems connected to the computer system.

Figure 13:
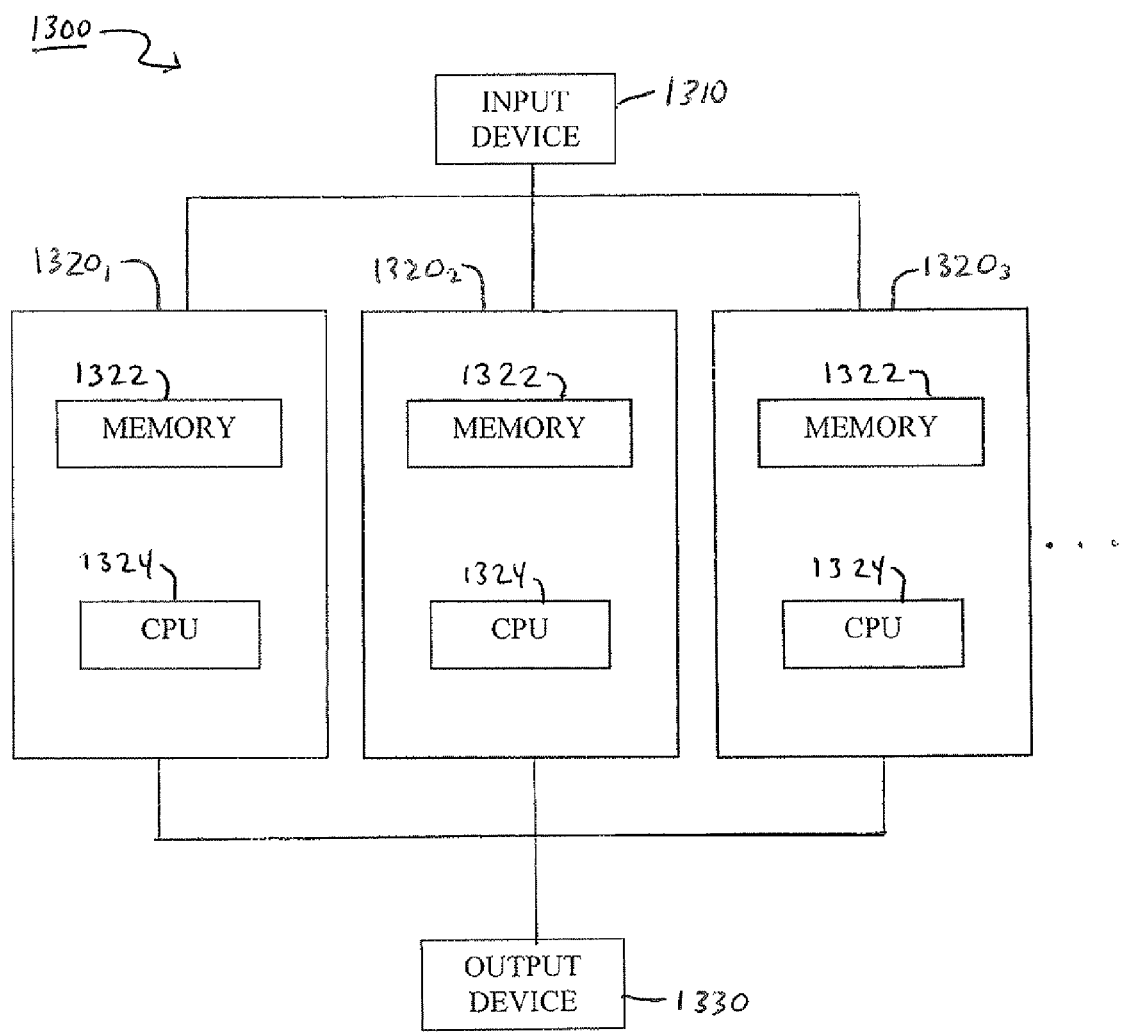
FIG. 13 is a block diagram of an exemplary embodiment of a computer system 1300 for performing the cascade SVM methods described herein.

FIG. 13 is a block diagram of an exemplary embodiment of a computer system 1300 for performing the cascade SVM methods described herein. The computer system 1300 includes an input device 1310, one or more processors $1320_1$-$1320_3$, and an output device 1330. The input device 1310 may comprise any device capable of inputting data about the phenomenon of interest including, without limitation, a tablet computer for generating handwritten digits, a digital camera, an ECG recorder, to name a few. The input device 1310 inputs training data corresponding to a phenomenon of interest, into the one or more processors $1320_1$-$1320_3$ in accordance with the methods disclosed herein. In one non-limiting embodiment, the training data may comprise a plurality of patterns for use in constructing a cascade SVM for use in pattern recognition or classification. In another non-limiting embodiment, the training data may comprise monetary data for use in constructing a cascade SVM for use in financial forecasting. The training data inputted into the one or more processors $1320_1$-$1320_3$ may be collected and preprocessed using suitable well known methods. Each of the processors $1320_1$-$1320_3$ includes a memory 1322 that stores programmed instructions for executing the cascade SVM described earlier. Each of the processors 1320 further includes a Central Processing Unit (CPU) 1324 for executing the cascade SVM program instructions disclosed herein, in order to construct the cascade SVM disclosed herein, using the training data, and thereby making the computer system 1300 operative for use in pattern recognition, regression analysis and predictive modeling, data classification, bioinformatics, data mining, and other useful applications.

After the computer implemented cascade SVM has been trained, the input device 1310 of the computer system 1300 inputs data corresponding to the phenomenon of interest, into the one or more processors $1320_1$-$1320_3$ in accordance with the methods disclosed herein. In the earlier mentioned embodiment where the cascade SVM has been trained for pattern recognition, the input data may comprise a plurality of patterns to be recognized by the computer system 1300 using the trained cascade SVM. In any case, the input data inputted into the one or more processors $1320_1$-$1320_3$ may also be collected and preprocessed using suitable well known methods. The CPU 1324 of each processor then executes the cascade SVM program instructions disclosed herein using the support vectors obtained during the training or construction of the cascade SVM, in order to classify, analyze, mine, or otherwise transform the input data corresponding to the phenomenon of interest into a useful result. The one or more processors $1320_1$-$1320_3$ then output the result of the cascade SVM (e.g., recognized pattern) to the output device 1330. In embodiments where the output device 1330 comprises a display monitor, the display monitor may display the transformed data in a suitable manner so that a user can make some decision or take some action (e.g., identify an image, recognize a handwriting sample, buy or sell a stock, and control a manufacturing process, to name a few). Alternatively, the output device 1330 may comprise a device that further processes the transformed data and automatically makes a decision or takes some action as a result of or in response to the data.

The foregoing Detailed Description is to be understood as being in every respect illustrative and exemplary, but not restrictive, and the scope of the invention is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The following is the formal proof that a cascade SVM in accordance with the principles of the present invention will convergence to the global optimum solution.

Let S denote a subset of the training set $\Omega$, W(S) is the optimal objective function over S (see quadratic optimization function from paragraph [0039]), and let $Sv(S) \subset S$ be the subset of S for which the optimal $\alpha$ are non-zero (support vectors of S). It is obvious that:

$$\forall S \subset \Omega, W(S)=W(Sv(S)) \leq W(\Omega)$$

Let us consider a family F of sets of training examples for which we can independently compute the SVM solution. The set $S^* \in F$ that achieves the greatest W(S) will be called the best set in family F. We will write W(F) as a shorthand for W(S*), that is:

$$W(F) = \max_{S \in F} W(S) \leq W(\Omega) \qquad (4)$$

We are interested in defining a sequence of families $F_t$ such that $W(F_t)$ converges to the optimum. Two results are relevant for proving convergence.

Theorem 1: Let us consider two families F and G of subsets of $\alpha$. If a set $T \in G$ contains the support vectors of the best set $S^*_F \in F$, then $W(G) \geq W(F)$.
Proof: Since $Sv(S^*_F) \subset T$, we have $W(S^*_F)=W(Sv(S^*_F)) \leq W(T)$. Therefore, $W(F)=W(S^*_F) \leq W(T) \leq W(G)$
Theorem 2: Let us consider two families F and G of subsets of $\Omega$. Assume that every set $T \in G$ contains the support vectors of the best set $S^*_F \in F$.

If $W(G)=W(F) \Rightarrow W(S^*_F)=W(\cup_{T \in G} T)$.

Proof: Theorem 1 implies that $W(G) \geq W(F)$. Consider a vector $\alpha^*$ solution of the SVM problem restricted to the support vectors $Sv(S^*_F)$. For all $T \in G$, we have $W(T) \geq W(Sv(S^*_F))$ because $Sv(S^*_F)$ is a subset of T. We also have $W(T) \leq W(G)=W(F)=W(S^*_F)=W(Sv(S^*_F))$. Therefore $W(T)=W(Sv(S^*_F))$. This implies that $\alpha^*$ is also a solution of the SVM on set T. Therefore $\alpha^*$ satisfies all the KKT conditions corresponding to all sets $T \in G$. This implies that $\alpha^*$ also satisfies the KKT conditions for the union of all sets in G. □
Definition 1. A Cascade is a sequence $(F_t)$ of families of subsets of $\Omega$ satisfying:

i) For all t>1, a set T∈$F_t$ contains the support vectors of the best set in $F_{t-1}$.
ii) For all t, there is a k>t such that:
All sets T∈$F_k$ contain the support vectors of the best set in $F_{k-1}$.
The union of all sets in $F_k$ is equal to $\tilde{\Omega}$.

Theorem 3: A Cascade ($F_t$) converges to the SVM solution of $\tilde{\Omega}$ in finite time, namely:

$$\exists t^*, \forall t > t^*, W(F_t) = W(\Omega)$$

Proof: Assumption i) of Definition 1 plus theorem 1 imply that the sequence $W(F_t)$ is monotonically increasing. Since this sequence is bounded by $W(\Omega)$, it converges to some value $W^* \leq W(\Omega)$. The sequence $W(F_t)$ takes its values in the finite set of the W(S) for all S ⊂ Ω. Therefore there is a l>0 such that ∀t>l, $W(F_t)$=W*. This observation, assertion ii) of definition 1, plus theorem 2 imply that there is a k>l such that $W(F_k)$=W(Ω). Since $W(F_t)$ is monotonically increasing, $W(F_k)$=W(Ω) for all t>k.

The invention claimed is:

1. A method for training a Cascade Support Vector Machine for use as a classifier, the method comprising the steps of:
   a. encoding training data into a set of data vectors;
   b. dividing the data set into a plurality of data subsets;
   c. training a Cascade Support Vector Machine as a classifier for classifying data into different classes by:
      i. performing a plurality of optimizations on a plurality of Support Vector Machines (SVMs) using the plurality of data subsets as inputs for the plurality of SVMs to obtain for each of the SVMs a set of support vectors;
      ii. performing one or more additional optimizations on the plurality of SVMs using as inputs the sets of support vectors obtained by the previous optimizations; and
      iii. repeating step ii until a single subset of the set of support vectors is obtained.

2. The method of claim 1 further comprising the step of performing further optimizations using the single subset of the set of support vectors and the plurality of data subsets as inputs into the plurality of SVMs, to test for convergence.

3. The method of claim 1 wherein the inputs for steps ii and iii further include at least a portion of the plurality of data subsets.

4. The method of claim 1 wherein the optimizations in at least one of steps i, ii and iii are performed in parallel.

5. The method of claim 1 wherein the optimizations in at least one of steps i, ii and iii are performed serially.

6. A computer readable medium comprising computer program instructions for training a Cascade Support Vector Machine for use as a classifier, the computer program instructions, when executed by a processor, defining the steps of:
   a. encoding training data into a set of data vectors;
   b. dividing the data set into a plurality of data subsets;
   c. training a Cascade Support Vector Machine as a classifier for classifying data into different classes by:
      i. performing a plurality of optimizations on a plurality of Support Vector Machines (SVMs) using the plurality of data subsets as inputs for the plurality of SVMs to obtain for each of the SVMs a set of support vectors;
      ii. performing one or more additional optimizations on the plurality of SVMs using as inputs the sets of support vectors obtained by the previous optimizations; and
      iii. repeating step ii until a single subset of the set of support vectors is obtained.

7. The computer readable medium of claim 6 further comprising the step of performing further optimizations using the single subset of the set of support vectors and the plurality of data subsets as inputs into the plurality of SVMs, to test for convergence.

8. The computer readable medium of claim 6 wherein the inputs for steps ii and iii further include at least a portion of the plurality of data subsets.

9. The computer readable medium of claim 6 wherein the optimizations in at least one of steps i, ii and iii are performed in parallel.

10. The computer readable medium of claim 6 wherein the optimizations in at least one of steps i, ii and iii are performed serially.

* * * * *